April 19, 1927.

J. AUDIBERT 1,625,586

METHOD AND APPARATUS FOR PRODUCING FILMS FOR COLOR PHOTOGRAPHY

Filed Dec. 9. 1926

Patented Apr. 19, 1927.

1,625,586

UNITED STATES PATENT OFFICE.

JEAN AUDIBERT, OF VILLEURBAUNE, FRANCE, ASSIGNOR TO THE CORPORATION SOCIÉTÉ DES FILMS EN COULEUR KELLER DORIAN, OF FRANCE.

METHOD AND APPARATUS FOR PRODUCING FILMS FOR COLOR PHOTOGRAPHY.

Application filed December 9, 1926, Serial No. 153,689, and in France December 4, 1925.

In various color photography processes, it is customary to employ a film having emulsion on one side and a large number of interfitting microscopic refringant elements on the other. The latter are generally formed by rolling the warmed film in contact with a suitably engraved cylinder. The microscopic refringant elements yield good results only in the event that they are each optically perfect, which is true only when they conform to the following requirements:

1. A section through a central axis of each element should disclose a curve whose top is of constant curvature for a given film thickness; this section may be circular, but should preferably be hyperbolic:—

2. The surface of each element should be highly polished;—

3. The intersection of the surfaces of two contiguous elements should be a sharp angle and should not diffuse the light.

The object of the present invention is to provide a method and apparatus for engraving cylindrical surfaces, intended to be used in impressing microscopic refringant elements upon commercial film so that said surfaces produce elements having the requirements of curvature, polish and sharpness of angle, enumerated above.

The principle underlying the mode of operation here disclosed consists in giving a mirror polish to the cylinder and in then working its surface with a tool having a working surface, which has also been given a mirror polish. Under these conditions, the imprint of the tool on the cylinder leaves a surface which itself has a mirror polish. Plastic film compressed against a cylinder thus prepared takes the curvature and the polish left on the cylinder by the tool.

Figure 1:
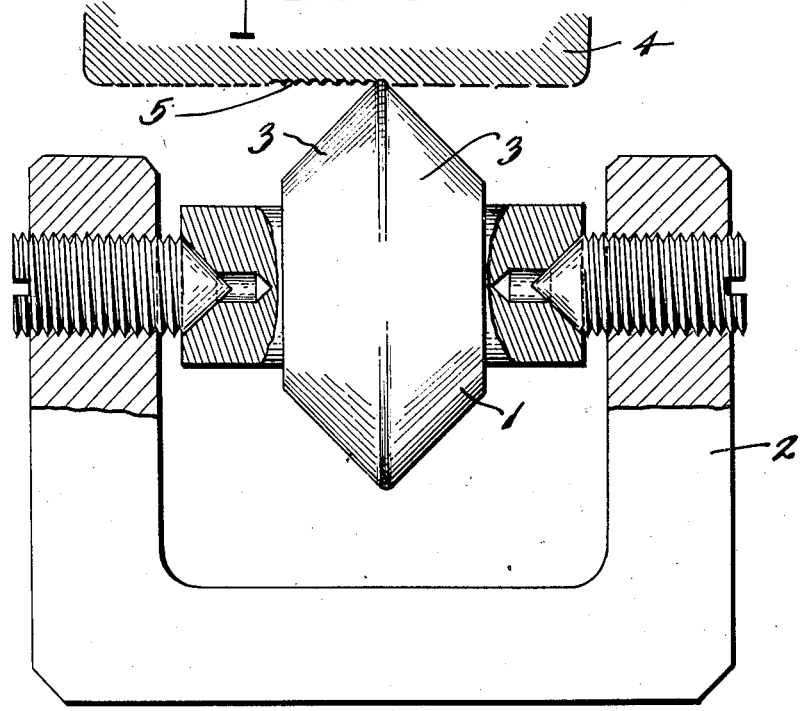
Figure 2:
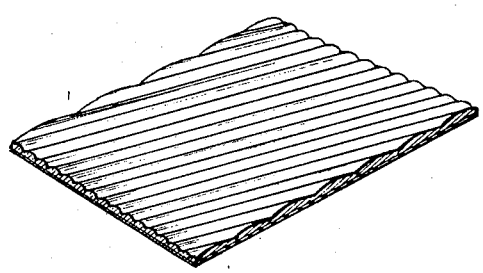

The manner in which the invention is carried out is illustrated in the drawing, wherein: Figure 1 is an enlarged view partly in section showing the tool in the process of forming grooves in a metal cylinder employed in carrying out the manufacture of films in accordance with this invention; and Figure 2 is a fragmentary sectional view of a film formed in accordance with the invention.

A disc-shaped wheel 1 of tempered steel is carefully mounted on a handle 2, and is shaped so as to have the form of a wheel such as is used for cutting glass. The converging surfaces 3 of the disc are then carefully polished and the projecting elements on the periphery thereof carefully corrected, so as to have the exact curvature of the refringant elements to be produced on a film surface.

A tool thus prepared may be used to work a polished cylinder 4 in a variety of patterns.

If it is desired, for example, to produce markings substantially perpendicular to the generatrix of the cylinder, the handle of the steel disc is mounted on the carriage of a lathe or similar precision machine adjusted to have a displacement corresponding to the distance between two microscopic elements. The axis of the disc being parallel to that of the cylinder, the former traces a spiral 5 upon the latter. The depth of the impression may be regulated by adjusting the pressure. The latter should be regulated so that contiguous impressions just touch and so that the angle between impressions is sharp.

If it is desired to engrave the polished cylinder in a direction parallel to its generatrix, it is only necessary to mount the handle of the steel disc on a dividing machine with the disc axis at right angles to the cylinder axis, the cylinder itself being mounted on the movable carriage. The carriage is then manipulated as on a planing or milling machine.

Helicoidal markings may be obtained by giving the steel disc a movement of translation while rotating the cylinder, the plane of the projections on the disc being maintained parallel to the helicoidal marking desired.

Cylinders engraved by any one of the methods above indicated when applied to a film produce a multitude of fine markings presenting exactly the curvature and polish of the projections on the steel disc. These films can then be used in color photography.

Cylinders as thus produced are superior to those made by striking the cylinder at successive points with a die. In using a die, a minute air bubble is entrapped between die and cylinder and film struck off from the cylinder yields refringant elements which invariably differ in shape from the die used in forming the cylinder.

Having now particularly described and ascertained the nature of my said invention and in what manner the same is to be performed, I declare that what I claim is:

1. An article of manufacture for use in the manufacture of color films comprising a disc having a periphery formed of a plurality of elements having the shape of a conic section of revolution to provide an operating periphery for forming grooves in a metal body incident to pressure of the disk thereagainst.

2. An article of manufacture for use in the manufacture of color films comprising a circular metallic disc having a plurality of elements formed on its periphery, said elements having the shape of a conic section of revolution, the periphery of said disc having a mirror polish.

3. The method of embossing plastic materials which comprises rolling a tool having a polished working surface over a polished cylinder, and rolling the polished cylinder over the plastic material.

4. The method of embossing transparent plastic materials which comprises rolling a tool having a polished working surface over a polished cylinder, so as to form a series of contiguous grooves on said cylinder, and rolling said cylinder under sufficient pressure against the plastic material to produce lenticular ridges conforming to the cylinder grooves.

5. A film suitable for use in color photography, comprising a transparent base provided on one side with a series of contiguous lenticular refracting ridges disposed at an angle to the axis of the film.

6. A film suitable for use in color photography comprising a transparent base provided on one side with a series of parallel lenticular refracting ridges the general direction of which is inclined to the axis of the film.

In testimony whereof I affix my signature.

JEAN AUDIBERT.